United States Patent
Baek et al.

(10) Patent No.: US 11,700,438 B2
(45) Date of Patent: Jul. 11, 2023

(54) VISION SENSOR AND OPERATING METHOD THEREOF

(71) Applicant: SAMSUNG ELECTRONICS CO., LTD., Suwon-si (KR)

(72) Inventors: Jaeho Baek, Suwon-si (KR); Jeongseok Kim, Suwon-si (KR); Jongseok Seo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/550,196

(22) Filed: Dec. 14, 2021

(65) Prior Publication Data

US 2022/0191370 A1 Jun. 16, 2022

(30) Foreign Application Priority Data

Dec. 15, 2020 (KR) .................. 10-2020-0175832

(51) Int. Cl.
  *H04N 23/52* (2023.01)
  *H04N 25/77* (2023.01)
  *H04N 25/709* (2023.01)
  *G01K 7/02* (2021.01)

(52) U.S. Cl.
  CPC ............. *H04N 23/52* (2023.01); *H04N 25/77* (2023.01)

(58) Field of Classification Search
  CPC .. H04N 5/3745; H04N 5/3741; H04N 5/3698; H04N 5/3765; H04N 5/357; H04N 23/52; H04N 25/77; H04N 25/766; H04N 25/709; G01K 7/02
  See application file for complete search history.

(56) References Cited

U.S. PATENT DOCUMENTS

| | | | |
|---|---|---|---|
| 9,739,660 B2 | 8/2017 | Suh et al. | |
| 10,133,334 B2 | 11/2018 | Liu et al. | |
| 10,436,884 B2 | 10/2019 | Wu et al. | |
| 10,567,679 B2 | 2/2020 | Berner et al. | |
| 11,114,983 B2* | 9/2021 | Choi | H03F 1/26 |
| 2019/0364237 A1 | 11/2019 | Yeo et al. | |
| 2020/0084403 A1 | 3/2020 | Suh et al. | |
| 2020/0410272 A1* | 12/2020 | Seo | G06V 10/147 |
| 2021/0185258 A1* | 1/2021 | Kim | H04N 25/745 |
| 2021/0067100 A1* | 3/2021 | Choi | H03F 1/26 |
| 2021/0218925 A1* | 7/2021 | Nagaki | H04N 5/37455 |
| 2021/0250528 A1* | 8/2021 | Kim | G01J 1/44 |
| 2022/0026541 A1* | 1/2022 | Ozawa | H04N 25/75 |

FOREIGN PATENT DOCUMENTS

KR    10-2018-0058162    5/2018

* cited by examiner

*Primary Examiner* — Marly S Camargo
(74) *Attorney, Agent, or Firm* — F. Chau & Associates, LLC (57) ABSTRACT

A vision sensor includes a pixel array including a plurality of pixels, a voltage generator configured to generate a reset bias voltage provided to each of the plurality of pixels, a temperature comparing circuit configured to output a switching setting value according to a result of comparing temperature information with at least one reference temperature value, and a voltage level controller configured to generate a reset bias setting signal based on the switching setting value. The reset bias setting signal adjusts a voltage level of the reset bias voltage.

20 Claims, 10 Drawing Sheets

VISION SENSOR AND OPERATING METHOD THEREOF

CROSS-REFERENCE TO RELATED APPLICATIONS

This application claims priority under 35 U.S.C. § 119 to Korean Patent Application No. 10-2020-0175832, filed on Dec. 15, 2020 in the Korean Intellectual Property Office, the disclosure of which is incorporated by reference herein in its entirety.

TECHNICAL FIELD

Embodiments of the inventive concept relate to a vision sensor, and more particularly, to a vision sensor that operates based on temperature information, and an operating method of the vision sensor.

DISCUSSION OF RELATED ART

A human-computer interaction (HCl) is expressed and operated in a user interface. Various user interfaces that recognize user inputs may provide natural interactions between humans and computers. Various sensors may be used to recognize user inputs.

A vision sensor such as, for example, a dynamic vision sensor, generates, upon the occurrence of an event (e.g., a variation in an intensity of light), information about the event, that is, an event signal, and transmits the event signal to a processor. Pixels included in a vision sensor may change their operating characteristics according to temperature.

SUMMARY

Embodiments of the inventive concept provide a vision sensor that detects temperature information and controls an operation thereof according to the temperature information, and an operating method of the vision sensor.

According to an embodiment of the inventive concept, a vision sensor includes a pixel array including a plurality of pixels, a voltage generator configured to generate a reset bias voltage provided to each of the plurality of pixels, a temperature comparing circuit configured to output a switching setting value according to a result of comparing temperature information with at least one reference temperature value, and a voltage level controller configured to generate a reset bias setting signal based on the switching setting value. The reset bias setting signal adjusts a voltage level of the reset bias voltage.

According to an embodiment of the inventive concept, a vision sensor includes a pixel array including a plurality of pixels, a voltage generator configured to generate a reset bias voltage provided to each of the plurality of pixels, a temperature sensor controller configured to generate temperature information, a temperature comparing circuit configured to output a switching setting value according to the temperature information, and a voltage level controller configured to generate a reset bias setting signal based on the switching setting value. The reset bias setting signal adjusts a voltage level of the reset bias voltage.

According to an embodiment of the inventive concept, an operating method of a vision sensor including a plurality of pixels includes generating multiple pieces of temperature information at different time points from each other by sensing a temperature of the vision sensor, obtaining a specified number of pieces of the temperature information, and adjusting a voltage level of a reset switching signal provided to the plurality of pixels based on the obtained specified number of pieces of the temperature information. The plurality of pixels is reset according to the reset switching signal.

BRIEF DESCRIPTION OF THE DRAWINGS

The above and other features of the inventive concept will become more apparent by describing in detail example embodiments thereof with reference to the accompanying drawings, in which.

DETAILED DESCRIPTION OF THE EMBODIMENTS

Example embodiments of the inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

As used herein, the singular forms "a", "an" and "the" are intended to include the plural forms as well, unless the context clearly indicates otherwise.

Figure 1:
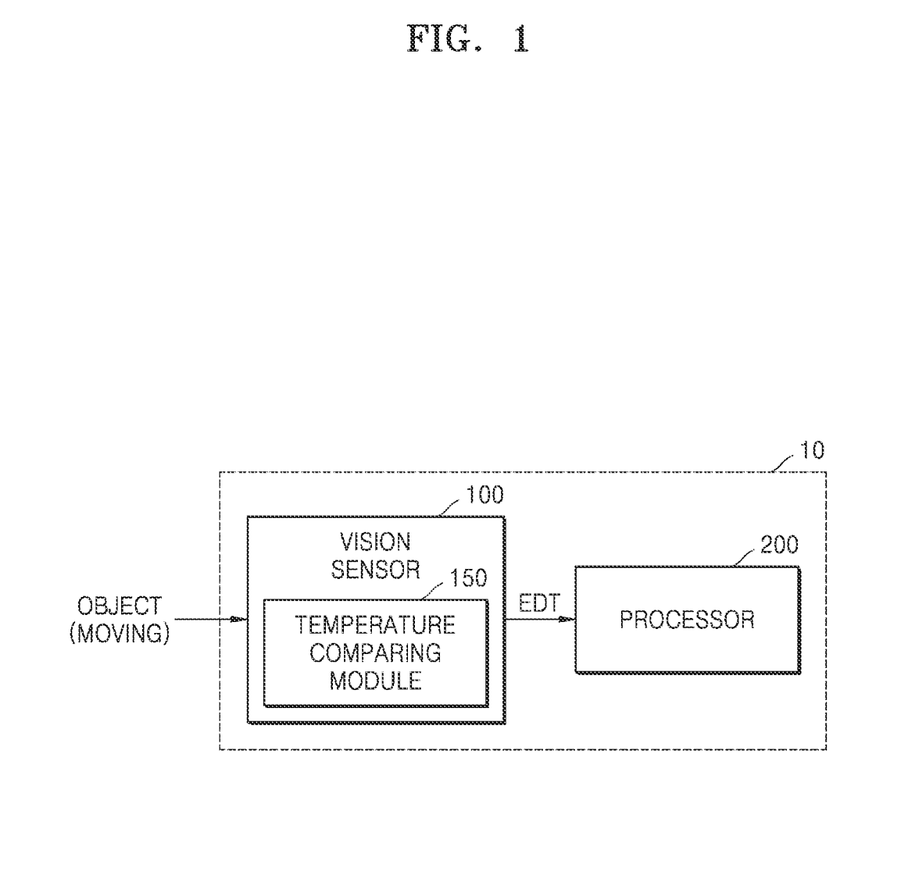
FIG. 1 is a block diagram illustrating an image processing device according to an example embodiment of the inventive concept.

FIG. 1 is a block diagram illustrating an image processing device 10 according to an example embodiment of the inventive concept.

The image processing device 10 according to an example embodiment of the inventive concept may be mounted in an electronic device having an image or light sensing function. For example, the image processing device 10 may be mounted in an electronic device such as a camera, a smartphone, a wearable device, an Internet of Things (IoT) device, a tablet personal computer (PC), a personal digital assistant (PDA), a portable multimedia player (PMP), a navigation device, a drone, an Advanced Drivers Assistance System (ADAS), or the like. The image processing device 10 may be included as a component of, for example, a vehicle, furniture, manufacturing equipment, a door, various measuring instruments, or the like.

Referring to FIG. 1, the image processing device 10 may include a vision sensor 100 and a processor 200.

The vision sensor 100 may detect a variation in an intensity of incident light and output event data EDT. The vision sensor 100 may include a dynamic vision sensor that outputs the event data EDT generated from pixels (e.g., PX in FIG. 2) in which a variation in light is detected, that is, pixels in which an event has occurred. The variation in the intensity of light may be due to, for example, a movement of an object of which an image is captured using the vision sensor 100, or due to a movement of the vision sensor 100 or the image processing device 10. The vision sensor 100 may transmit the event data EDT to the processor 200 periodically or non-periodically. The vision sensor 100 may transmit the event data EDT to the processor 200 in a unit of packets or frames.

The vision sensor 100 may selectively transmit the event data EDT to the processor 200. The vision sensor 100 may transmit, to the processor 200, the event data EDT generated from pixels PX corresponding to a region of interest set in a pixel array PA (e.g., PA in FIG. 2) from among event signals generated to correspond to the pixel array PA.

In an example embodiment, the vision sensor 100 may include a temperature comparing module 150. The temperature comparing module 150 of the vision sensor 100 may adjust a voltage level of a reset switching signal (e.g., SWS of FIG. 4) provided to each of the pixels PX, based on temperature information detected by a temperature sensor. For example, when the reset switching signal SWS is logic high, a voltage level thereof may be adjusted. The temperature comparing module 150 may also be referred to as a temperature comparing circuit.

When a temperature of an environment in which the vision sensor 100 operates is excessively increased, a leakage current in a reset switch (e.g., SW of FIG. 4) included in each of the pixels PX, for example, a leakage current in a channel, may be increased. Accordingly, the vision sensor 100 may adjust a leakage current of the reset switch SW included in each of the pixels PX by adjusting the voltage level of the reset switching signal SWS provided to the reset switch SW, based on temperature information.

The processor 200 may process the event data EDT received from the vision sensor 100, and may detect a movement of an object (or a movement of an object on an image recognized by the image processing device 10). The processor 200 may include, for example, an application specific integrated circuit (ASIC), a field-programmable gate array (FPGA), a dedicated microprocessor, a microprocessor, a general-purpose processor, or the like. According to an example embodiment, the processor 200 may include an application processor or an image processor.

Each of the vision sensor 100 and the processor 200 may be implemented as an integrated circuit (IC). For example, the vision sensor 100 and the processor 200 may be implemented as separate semiconductor chips. Alternatively, the vision sensor 100 and the processor 200 may be implemented as a single chip. For example, each of the vision sensor 100 and the processor 200 may be implemented as a system-on-chip (SoC).

Figure 2:
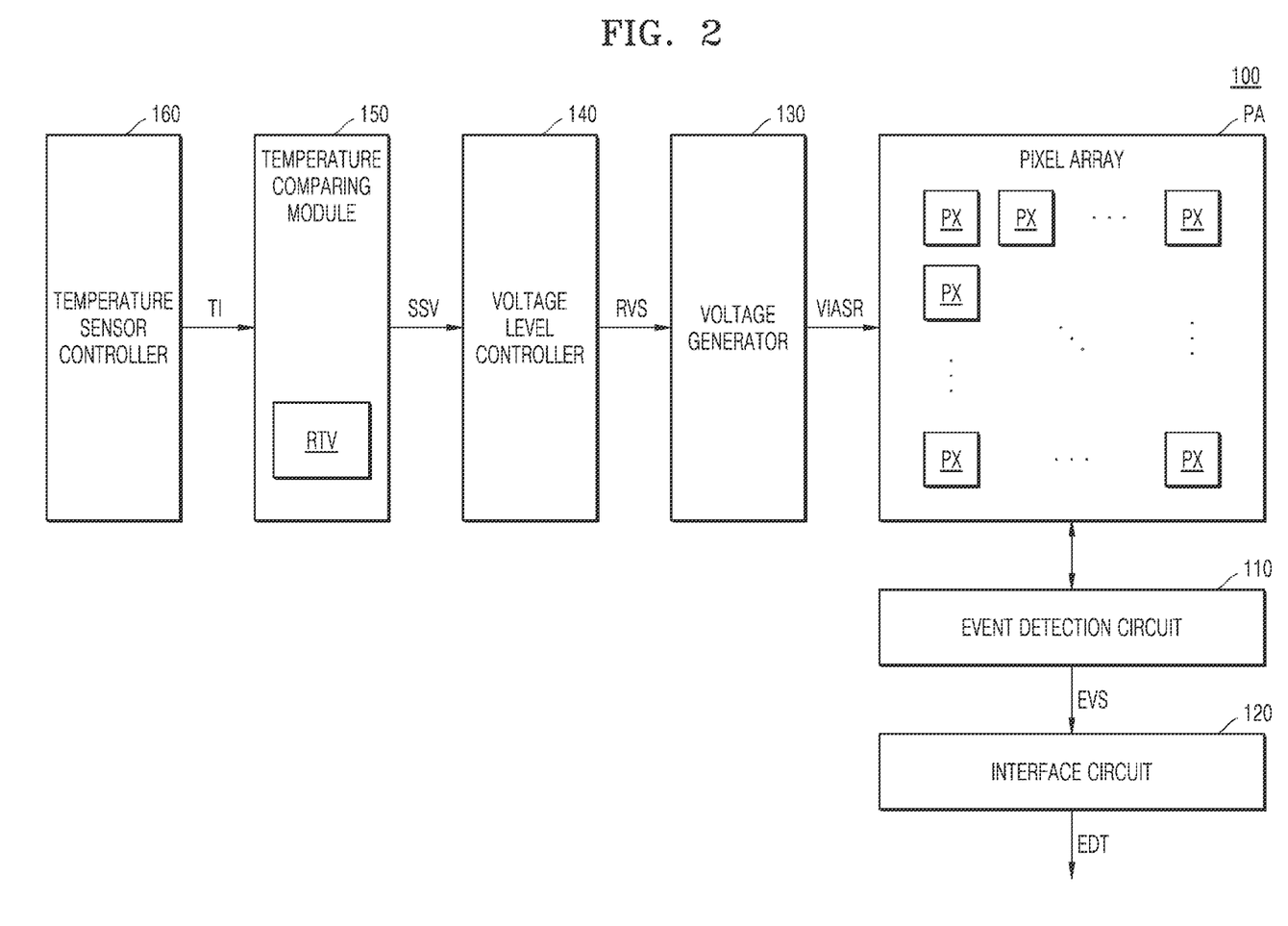
FIG. 2 is a block diagram illustrating a vision sensor according to an example embodiment of the inventive concept.
Figure 3:
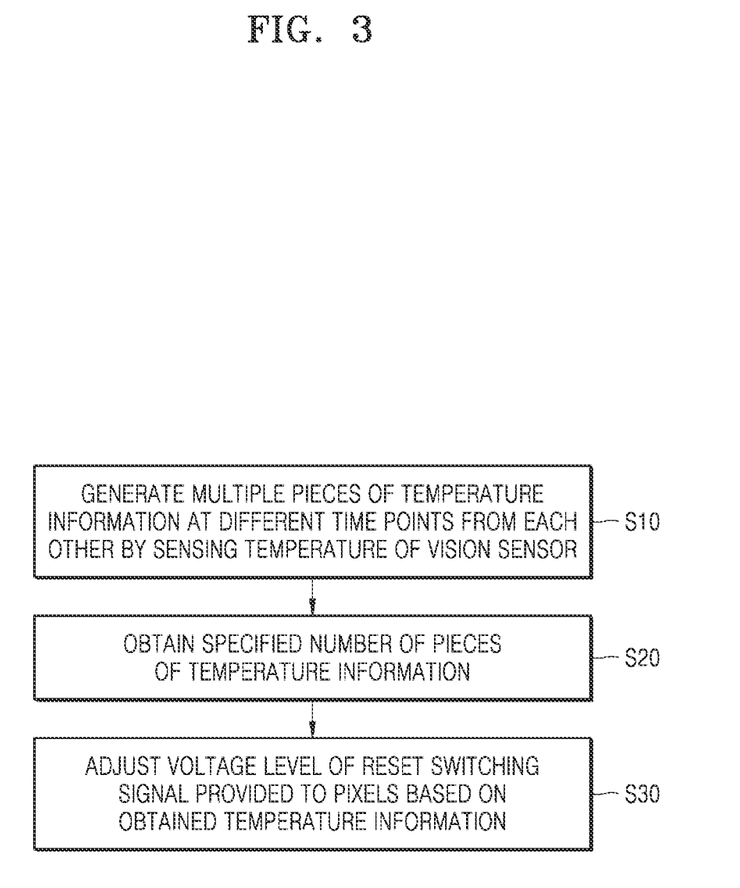
FIG. 3 is a flowchart of an operating method of a vision sensor according to an example embodiment of the inventive concept.

FIG. 2 is a block diagram illustrating the vision sensor 100 according to an example embodiment of the inventive concept. FIG. 3 is a flowchart of an operating method of the vision sensor 100 according to an example embodiment of the inventive concept.

Referring to FIG. 2, the vision sensor 100 may include the pixel array PA, an event detection circuit 110, an interface circuit 120, and a voltage generator 130. The voltage generator 130 may also be referred to as a voltage generator circuit.

The pixel array PA may include a plurality of pixels PX arranged in a matrix form. Each of the plurality of pixels PX may detect events such as an increase or a decrease in an intensity of received light. For example, each of the plurality of pixels PX may be connected to the event detection circuit 110 via column lines extending in a column direction and row lines extending in a row direction. A signal indicating that an event has occurred and polarity information of the event (e.g., whether the event is an on-event where an intensity of light increases or an off-event where the intensity of light decreases) may be output from the pixel PX in which the event has occurred to the event detection circuit 110.

The event detection circuit 110 may read events from the pixel array PA and process the events. The event detection circuit 110 may generate an event signal EVS including polarity information of the occurred event, an address of the pixel PX in which the event has occurred, and a timestamp. The event detection circuit 110 may process events that occurred in the pixel array PA in units of pixels PX, in units of pixel groups including the plurality of pixels PX, in units of columns, or in units of frames.

The event detection circuit 110 may include a row address event representation (AER) generator, a column AER generator, and an event signal processor. The row AER generator may receive, from the pixel PX in which an event has occurred, a signal notifying that the event has occurred, for example, a request (e.g., REQ of FIG. 4), and generate a row address of the pixel PX in which the event has occurred. The column AER generator may receive, from the pixel PX in which an event has occurred, a signal notifying that the event has occurred, for example, a request (e.g., REQ of FIG. 4), and generate a column address of the pixel PX in which the event has occurred.

The event signal processor may generate the event signal EVS, based on the row address and the column address received from the row AER generator and the column AER generator, a polarity signal (e.g., a signal indicating an occurrence of an on-event or an off-event) generated by the pixel PX, and a timestamp (e.g., information about a time at which the event has occurred). The event signal processor may remove a noise event, and generate an event signal EVS with respect to valid events. For example, when an amount of events that occurred for a certain period of time is less than a threshold value, the event signal processor may determine the events as noise, and may not generate an event signal EVS with respect to the noise event.

The interface circuit 120 may receive a plurality of event signals EVS and transmit the event data EDT to a processor (e.g., 200 of FIG. 1) according to a set protocol. The interface circuit 120 may generate the event data EDT by packaging the event signals EVS in a unit of individual signals, a unit of packet, or a unit of frames according to the set protocol, and transmit the event data EDT to the processor 200. For example, the interface circuit 120 may include one of an AER interface, a Mobile Industry Processor Interface (MIPI) interface, and a parallel interface.

The voltage generator 130 may generate voltages provided to the pixel array PA. For example, the voltage generator 130 may generate reference voltages used to detect an on-event or an off-event from the pixel PX or bias voltages. The voltage generator 130 may change voltage levels of the reference voltages (or the bias voltages) under the control of a voltage level controller 140. The voltage level controller 140 may also be referred to as a voltage level controller circuit. In an example embodiment, the voltage generator 130 may generate a reset bias voltage VIASR that determines a voltage level of the reset switching signal SWS provided to a reset switch (e.g., SW of FIG. 4) of the pixel PX.

The vision sensor 100 may include the voltage level controller 140. The voltage level controller 140 may generate a reset bias setting signal RVS that changes the reset bias voltage VIASR to a set particular level. In an example embodiment, the voltage level controller 140 may provide, to the voltage generator 130, the reset bias setting signal RVS corresponding to a preset register value in the voltage level controller 140. Alternatively, in an example embodiment, the voltage level controller 140 may receive a switching setting value SSV from the temperature comparing module 150 and provide the reset bias setting signal RVS that is changed according to temperature information TI to the voltage generator 130.

The vision sensor 100 may include the temperature comparing module 150 and a temperature sensor controller 160. The temperature sensor controller 160 may also be referred to as a temperature sensor controller circuit. The temperature sensor controller 160 may provide, to the temperature comparing module 150, the temperature information TI corresponding to the temperature of an environment in which the vision sensor 100 operates. In an example embodiment, the vision sensor 100 may include a temperature sensor, and the temperature information TI according to a temperature sensed by the temperature sensor may be provided to the temperature comparing module 150.

The temperature comparing module 150 may receive the temperature information TI and output a switching setting value SSV according to a result of comparing a reference temperature value RTV with the temperature information TI. For example, a plurality of reference temperature values RTV may be set in the temperature comparing module 150, and a switching setting value SSV according to results of comparing the temperature information TI with each of the plurality of reference temperature values RTV may be provided to the voltage level controller 140. The voltage level controller 140 may generate the reset bias setting signal RVS based on the switching setting value SSV.

Referring to FIGS. 2 and 3, the vision sensor 100 may generate multiple pieces of temperature information TI by sensing a temperature in operation S10. At this time, the multiple pieces of temperature information TI may be respectively generated by sensing a temperature of the vision sensor 100 at different time points from each other.

The vision sensor 100 may obtain a specified number of pieces of temperature information TI in operation S20. For example, the temperature sensor controller 160 may periodically transmit multiple pieces of the temperature information TI to the temperature comparing module 150, and the temperature comparing module 150 may obtain a specified number of pieces of temperature information TI.

The vision sensor 100 may adjust a voltage level of a reset switching signal provided to the pixels PX based on the specified number of pieces of temperature information TI obtained from the temperature sensor controller 160 in operation S30. For example, the temperature comparing module 150 may perform comparison operations of comparing the reference temperature value RTV with the specified number of pieces of temperature information TI obtained from the temperature sensor controller 160 by a specified number of times, and may generate the switching setting value SSV according to results of performing comparison operations. The voltage level controller 140 may generate, based on the switching setting value SSV, the reset bias setting signal RVS that changes the reset bias voltage VIASR to a set particular level, and the voltage generator 130 may generate, according to the reset bias setting signal RVS, the reset bias voltage VIASR that determines a voltage level of the reset switching signal SWS. At this time, the reset bias voltage VIASR may be used to generate a reset switching signal SWS for turning off a reset switch.

Because the vision sensor 100 of example embodiments of the inventive concept adjusts a voltage level of a reset switching signal according to the temperature information TI, a leakage current that may occur in a reset transistor in a high temperature state may be compensated for. Accordingly, an error in polarity information (e.g., whether an event is an on-event where an intensity of light increases or an off-event where an intensity of light decreases) of the event detected by the vision sensor 100 at a high temperature may be prevented or reduced.

Figure 4:
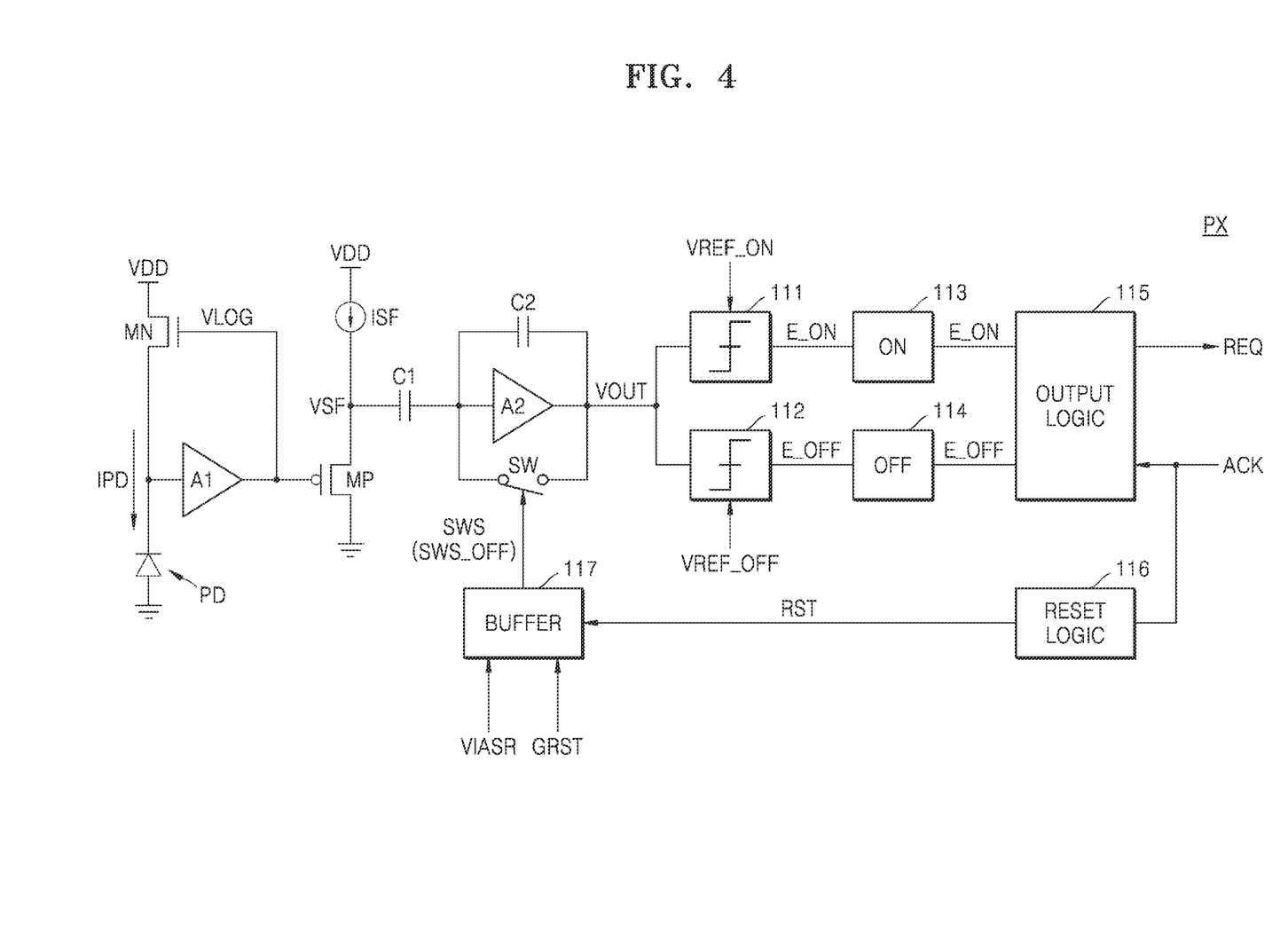
FIG. 4 is a circuit diagram illustrating an implementation example of a pixel of a vision sensor according to an example embodiment of the inventive concept.

FIG. 4 is a circuit diagram illustrating an implementation example of one of the pixels PX of a vision sensor according to an example embodiment of the inventive concept.

Referring to FIG. 4, the pixel PX may include a photoelectric conversion device PD, a first amplifier A1, a second amplifier A2, a first comparator 111, a second comparator 112, an on-event holder 113, an off-event holder 114, an output logic 115, a reset logic 116, a buffer 117, and the reset switch SW. The pixel PX may further include transistors MN and MP, capacitors C1 and C2, and a current source ISF, or the like.

The photoelectric conversion device PD may convert incident light, that is, an optical signal, into an electrical signal, for example, a current IPD. The photoelectric conversion device PD may include, for example, a photodiode, a phototransistor, a port gate or a pinned photodiode, or the like. The photoelectric conversion device PD may generate an electrical signal having a higher level as an intensity of incident light increases.

The photoelectric conversion device PD may generate the current IPD. The transistor MN and the first amplifier A1 are examples of a current-to-voltage converter, and may convert the current IPD into a voltage VLOG. In an example embodiment, the current-to-voltage converter may be implemented differently from that shown in FIG. 4. The transistor MN may be an n-type metal-oxide-semiconductor (NMOS) transistor to which a power supply voltage VDD is applied to one end thereof.

The current source ISF and the transistor MP may operate as a source follower, and may output a source follower voltage VSF. The transistor MP may be a p-type metal-oxide-semiconductor (PMOS) transistor to which a ground voltage is applied to one end thereof. In an example embodiment, the source follower may also include the current source ISF and an NMOS transistor to which the power supply voltage VDD is applied to one end thereof.

The capacitors C1 and C2 and the second amplifier A2 may operate as amplifiers to generate an output voltage VOUT by amplifying the source follower voltage VSF at a preset ratio. The output voltage VOUT may be provided to the first comparator 111 and the second comparator 112.

The reset switch SW may be connected between an input end and an output end of the second amplifier A2. The reset switch SW may be turned on or off in response to the reset switching signal SWS, and may reset the output voltage VOUT such that voltages of both ends of the second amplifier A2 become the same by connecting the input end to the output end of the second amplifier A2. In an example embodiment, the reset switch SW may be a PMOS transistor. However, the reset switch SW is not limited thereto, and the reset switch SW may be variously implemented according to example embodiments.

The first comparator 111 may compare the output voltage VOUT with an on-threshold voltage VREF_ON, and generate an on-signal E_ON based on the comparison result. The second comparator 112 may compare the output voltage VOUT of the second amplifier A2 with an off-threshold voltage VREF_OFF, and generate an off-signal E_OFF based on the comparison result. The first comparator 111 and the second comparator 112 may generate the on-signal E_ON or the off-signal E_OFF when a variation amount of light received by the photoelectric conversion device PD is about equal to or greater than a certain level of variation.

For example, the on-signal E_ON may be at a high level when a light amount received by the photoelectric conversion device PD increases to a certain level or more, and the off-signal E_OFF may be at a high level when a light amount received by the photoelectric conversion device PD is reduced to a certain level or less. The on-event holder 113 and the off-event holder 114 may respectively hold the on-signal E_ON and the off-signal E_OFF and then output the same.

The output logic 115 may receive the on-signal E_ON and the off-signal E_OFF, output, based on the on-signal E_ON and the off-signal E_OFF, a signal notifying a state in which a signal may be output, that is, a request REQ, and transmit the request REQ to an event detection circuit (e.g., 110 of FIG. 2). The event detection circuit 110 may transmit a response signal ACK to the pixel PX upon receiving the request REQ. The response signal ACK may be a signal notifying that the event detection circuit 110 has read polarity information (e.g., a signal indicating the occurrence of an on-event or an off-event) from the pixel PX.

The reset logic 116 may generate a reset signal RST by receiving the response signal ACK, and may transmit the reset signal RST to the buffer 117. The buffer 117 may generate, in response to the reset signal RST, the reset switching signal SWS for controlling the reset switch SW. The reset signal RST may be a signal for individually resetting the pixels PX included in a pixel array (e.g., PA of FIG. 2).

The buffer 117 may generate the reset switching signal SWS by receiving a global reset signal GRST. The global reset signal GRST may be a signal for resetting the whole pixel array PA, and the buffer 117 may generate, in response to the global reset signal GRST, the reset switching signal SWS for controlling the reset switch SW. That is, the global reset signal GRST may be a signal for commonly resetting the pixels PX included in the pixel array PA.

The buffer 117 may receive the reset bias voltage VIASR from the voltage generator 130 and generate the reset switching signal SWS by using the reset bias voltage VIASR. For example, the reset switch SW may be a PMOS transistor, and the buffer 117 may generate, by using the reset bias voltage VIASR, a reset switching signal SWS_OFF for turning off the reset switch SW. A voltage level of the reset switching signal SWS_OFF for turning off the reset switch SW may be changed as a voltage level of the reset bias voltage VIASR is changed. In an embodiment, the voltage level of the reset bias voltage VIASR may vary depending on a temperature at which a vision sensor operates.

Figure 5A:
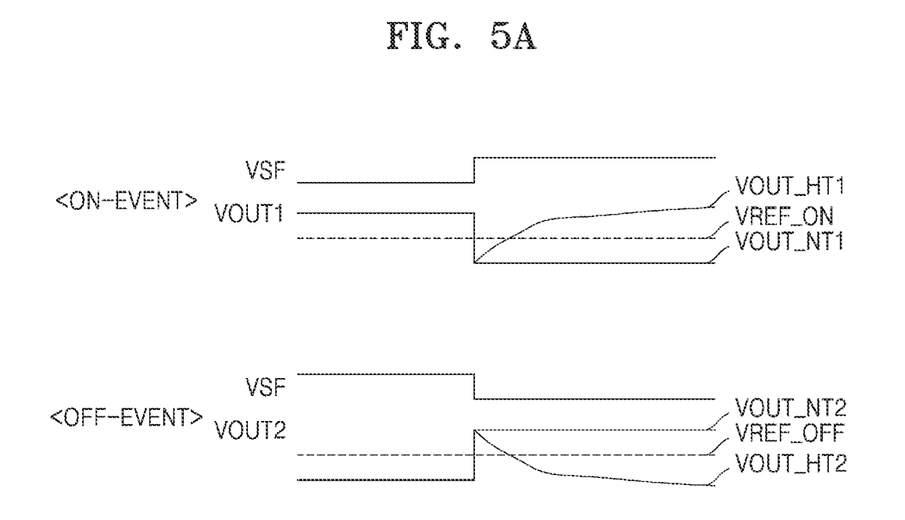
FIG. 5A is a diagram illustrating a change in an output voltage of an amplifier of a pixel according to temperature.
Figure 5B:
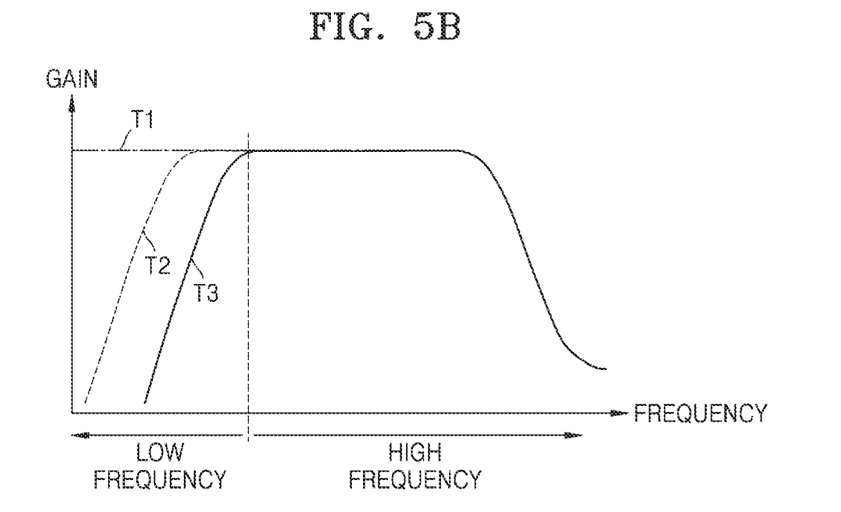
FIG. 5B is a diagram illustrating a change in a gain of an amplifier of a pixel with respect to a frequency according to temperature.

FIG. 5A is a diagram illustrating a change in the output voltage VOUT of an amplifier of a pixel according to temperature. FIG. 5B is a diagram illustrating a change in a gain of an amplifier of a pixel with respect to a frequency according to temperature. For example, FIG. 5A is a diagram for explaining a change in the output voltage VOUT when reset switching signals SWS having the same voltage level at different temperatures from each other are applied to the reset switch SW, according to a comparative example. For example, FIG. 5B is a diagram for explaining a change in the gain of the amplifier of the pixel when reset switching signals SWS having the same voltage level at different temperatures from each other are applied to the reset switch SW, according to a comparative example.

Referring to FIGS. 4 and 5A, as an on-event has occurred, a voltage level of the source follower voltage VSF may increase, and a first output voltage VOUT1 may be reduced. At this time, a first output voltage VOUT_NT1 at a normal temperature may be maintained in a reduced state, and on the contrary, a first output voltage VOUT_HT1 in a high-temperature state may decrease and then gradually increase due to a leakage current that occurred in the reset switch SW. Because the first output voltage VOUT1 is maintained at a level lower than that of the on-threshold voltage VREF_ON to allow the pixel PX to sense an on-event, the time at which an on-event may be sensed at a high temperature may be reduced.

A voltage of the source follower voltage VSF may be reduced as an off-event occurs, and a second output voltage VOUT2 may increase. At this time, a second output voltage VOUT_NT2 at a normal temperature may be maintained in an increased state, and on the contrary, a second output voltage VOUT_HT2 in a high-temperature state may increase and then gradually decrease due to a leakage current that occurred in the reset switch SW. Because the second output voltage VOUT2 is maintained at a level higher than the off-threshold voltage VREF_OFF to allow the pixel to sense an off-event, the time for sensing an off-event at a high temperature may be reduced.

The vision sensor according to an example embodiment may control a leakage current flowing through the reset switch SW by, according to temperature, differently adjusting voltage levels of the reset switching signal SWS to be applied to the reset switch SW, and may reduce a degree to which levels of the first output voltage VOUT1 corresponding to an on-event and the second output voltage VOUT2 corresponding to an off-event change over time. Accordingly, the vision sensor may increase the time for sensing an on-event and an off-event, and may increase the accuracy of sensing the on-event and the off-event.

Referring to FIGS. 4 and 5B, a first temperature T1 may be lower than a second temperature T2, and the second temperature T2 may be lower than a third temperature T3. In a region having a relatively low frequency, a gain of an amplifier including the capacitors C1 and C2 and the second amplifier A2 may rapidly decrease as a temperature increases, and when a vision sensor according to a comparative example is driven at a low frequency in a high temperature state, an error may occur in detecting an on-event or an off-event. Accordingly, the vision sensor of an example embodiment of the inventive concept may adjust, according to temperature, a voltage level of the reset switching signal SWS applied to the reset switch SW and may adjust an operating frequency according to the adjust voltage level of the reset switching signal SWS, and thus, the detection accuracy of an on-event and an off-event may be increased.

Figure 6:
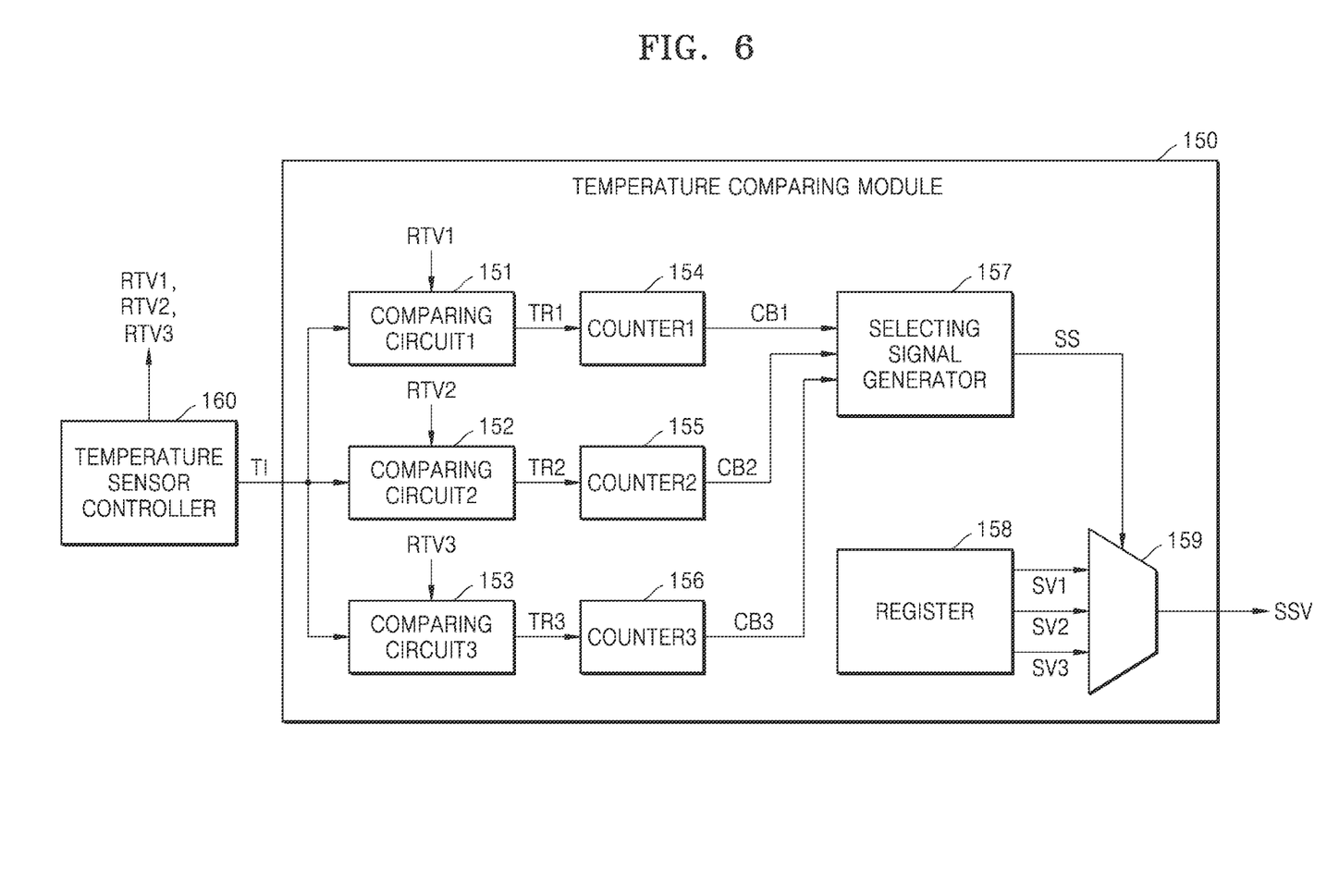
FIG. 6 is a block diagram illustrating a temperature comparing module of a vision sensor according to an example embodiment of the inventive concept.
Figure 7:
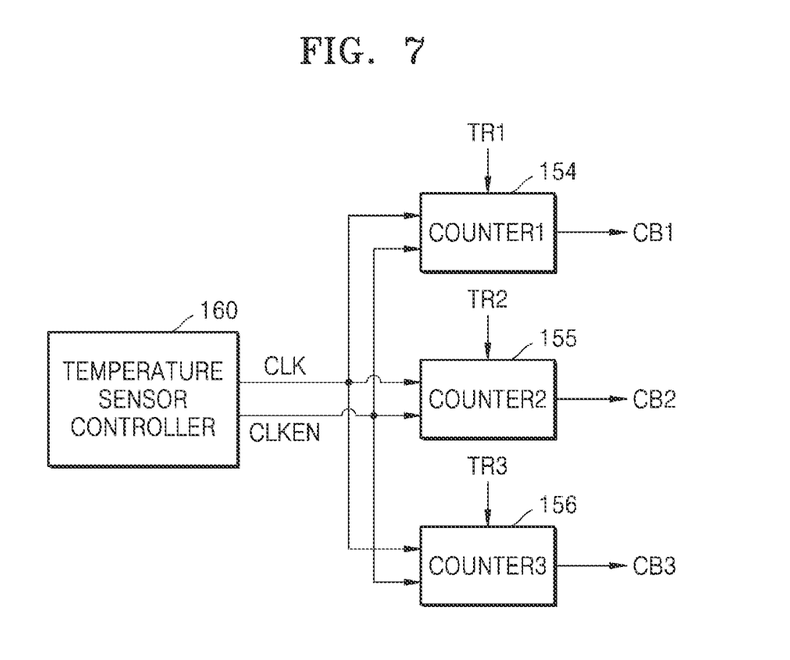
FIG. 7 is a block diagram illustrating counters included in the temperature comparing module of FIG. 6.

FIG. 6 is a block diagram illustrating the temperature comparing module 150 of the vision sensor 100 according to an example embodiment of the inventive concept. FIG. 7 is a block diagram illustrating counters 154 to 156 included in the temperature comparing module 150 of FIG. 6. The counters 154 to 156 may also be referred to as counter circuits.

Referring to FIG. 6, the temperature comparing module 150 may receive multiple pieces of temperature information TI generated at different time points from each other, and may output the switching setting value SSV by using a stored number of pieces of temperature information TI. The temperature comparing module 150 may include a plurality of comparing circuits 151 to 153, a plurality of counters 154 to 156, a selecting signal generator 157, a register 158, and a selector 159. The selecting signal generator 157 may also be referred to as a selecting signal generator circuit, and the selector 159 may also be referred to as a selector circuit.

The plurality of comparing circuits 151 to 153 may include a first comparing circuit 151, a second comparing circuit 152, and a third comparing circuit 153. The first comparing circuit 151 may receive the temperature information TI from the temperature sensor controller 160 and output a first result value TR1 obtained by comparing the temperature information TI with a first reference temperature value RTV1. The second comparing circuit 152 may receive the temperature information TI from the temperature sensor controller 160 and output a second result value TR2 obtained by comparing the temperature information TI with a second reference temperature value RTV2. The third comparing circuit 153 may receive the temperature information TI from the temperature sensor controller 160 and output a third result value TR3 obtained by comparing the temperature information TI with a third reference temperature value RTV3. Although three comparing circuits are illustrated in FIG. 6 as an example, example embodiments are not limited thereto, and the number of comparing circuits included in the temperature comparing module 150 may be variously configured according to example embodiments.

Because the plurality of comparing circuits 151 to 153 periodically receives the temperature information TI, the first to third reference temperature values RTV1 to RTV3 may respectively be compared with the pieces of temperature information TI that are periodically received with each other. Accordingly, the first comparing circuit 151 may periodically output first result values TR1, the second comparing circuit 152 may periodically output second result values TR2, and the third comparing circuit 153 may periodically output third result values TR3.

In an example embodiment, the first to third reference temperature values RTV1 to RTV3 may be preset in the temperature comparing module 150. Alternatively, in an example embodiment, the plurality of comparing circuits 151 to 153 may receive the first to third reference temperature values RTV1 to RTV3 from the temperature sensor controller 160.

A temperature corresponding to each of the first to third reference temperature values RTV1 to RTV3 may gradually increase. For example, a temperature corresponding to the first reference temperature value RTV1 may be lower than a temperature corresponding to the second reference temperature value RTV2, and the temperature corresponding to the second reference temperature value RTV2 may be lower than a temperature corresponding to the third reference temperature value RTV3.

Referring to FIGS. 6 and 7, the plurality of counters 154 to 156 may include a first counter 154, a second counter 155, and a third counter 156. The number of counters included in the temperature comparing module 150 may be the same as the number of comparing circuits. For example, each comparing circuit may be connected to a corresponding counter.

The first counter 154 may receive the first result value TR1 from the first comparing circuit 151, and may output, by using a clock signal CLK, a first counting bit CB1 obtained by counting the first result value TR1. The second counter 155 may receive the second result value TR2 from the second comparing circuit 152, and may output, by using the clock signal CLK, a second counting bit CB2 obtained by counting the second result value TR2. The third counter 156 may receive the third result value TR3 from the third comparing circuit 153, and may output, by using the clock signal CLK, a third counting bit CB3 obtained by counting the third result value TR3.

At this time, the first counter 154 may periodically receive first result values TR1 from the first comparing circuit 151, and may periodically output first counting bits CB1 by counting each of the first result values TR1 that are received periodically. The second counter 155 may periodically receive second result values TR2 from the second comparing circuit 152, and may periodically output second counting bits CB2 by counting each of the second result values TR2 that are received periodically. The third counter 156 may periodically receive third result values TR3 from the third comparing circuit 153, and may output third counting bits CB3 by counting each of the third result values TR3 that are received periodically.

The plurality of counters 154 to 156 may receive the clock signal CLK from the temperature sensor controller 160, and may receive a clock enable signal CLKEN. The plurality of counters 154 to 156 may operate counting operations when the clock enable signal CLKEN is activated. However, unlike FIG. 7, the clock signal CLK may not be received from the temperature sensor controller 160, and the clock signal CLK may be generated by the temperature comparing module 150.

Referring again to FIG. 6, the selecting signal generator 157 may receive the first counting bits CB1, the second counting bits CB2, and the third counting bits CB3 that are periodically generated, and may generate a selecting signal SS based on a particular number of first counting bits CB1, second counting bits CB2, and third counting bits CB3.

In an example embodiment, the selecting signal generator 157 may generate the selecting signal SS after receiving a preset number of first counting bits CB1, second counting bits CB2, and third counting bits CB3. For example, the selecting signal generator 157 may sequentially receive the first to third counting bits CB1 to CB3 by a specified number of comparisons according to a time order, wherein the first to third counting bits CB1 to CB3 are generated by performing, by each of the plurality of comparing circuits 151 to 153, comparison operations and performing, by each of the plurality of counters 154 to 156, counting operations. The selecting signal generator 157 may generate the selecting signal SS based on the first counting bits CB1 of a number of comparisons which are generated at different time points from each other, the second counting bits CB2 of a number of comparisons which are generated at different time points from each other, and the third counting bits CB3 of a number of comparisons which are generated at different time points from each other.

The selector 159 may receive, from the register 158, a first setting value SV1, a second setting value SV2, and a third setting value SV3, which are preset in the register 158, and may output, in response to the selecting signal SS, one of the first to third setting values SV1 to SV3 as the switching setting value SSV to the outside of the temperature comparing module 150. For example, the selector 159 may include a multiplexer.

Each of the first setting value SV1, the second setting value SV2, and the third setting value SV3 may be transmitted to the voltage level controller 140, and the voltage level controller 140 may generate the reset bias setting signal RVS according to each of the first setting value SV1, the second setting value SV2, and the third setting value SV3. Accordingly, the voltage generator 130 may generate the reset bias voltage VIASR corresponding to each of the first setting value SV1, the second setting value SV2, and the third setting value SV3.

Figure 8:
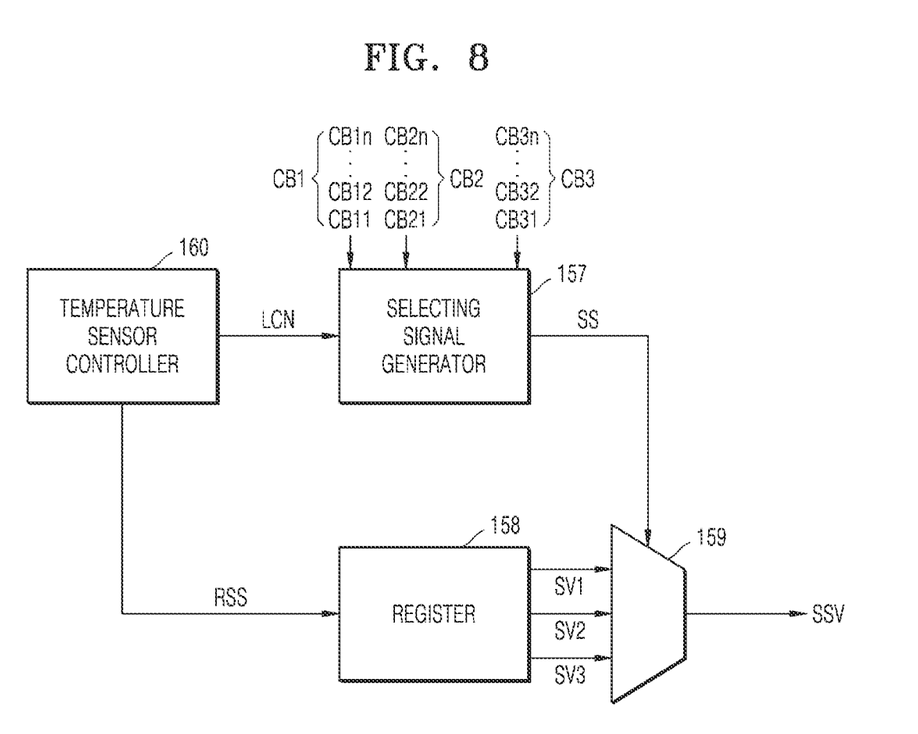
FIG. 8 is a block diagram illustrating a selecting signal generator and a register included in the temperature comparing module of FIG. 6.

FIG. 8 is a block diagram illustrating the selecting signal generator 157 and the register 158 included in the temperature comparing module 150 of FIG. 6.

Referring to FIG. 8, the selecting signal generator 157 may receive level count number information LCN from the temperature sensor controller 160. According to the level count number information LCN, the number of first counting bits CB1 (e.g., n, where n is a natural number), the number n of second counting bits CB2, and the number n of third counting bits CB3, which are received by the selecting signal generator 157 to generate the selecting signal SS, may be set.

For example, according to the level count number information LCN, the number of times receiving counting bits at different time points from each other may be set to n to generate the selecting signal SS. The selecting signal generator 157 may receive a first counting bit CB11, a second counting bit CB21, and a third counting bit CB31 at a first time point, receive a first counting bit CB12, a second counting bit CB22, and a third counting bit CB32 at a second time point, and receive a first counting bit CB1n, a second counting bit CB2n, and a third counting bit CB3n at a n-th time point. The selecting signal generator 157 may generate the selecting signal SS based on received first counting bits CB11 to CB1n, second counting bits CB21 to CB2n, and third counting bits CB31 to CB3n.

The register 158 may receive a register setting signal RSS from the temperature sensor controller 160. The first setting value SV1, the second setting value SV2, and the third setting value SV3 may be set in the register 158 by the register setting signal RSS. Values of the first setting value SV1, the second setting value SV2, and the third setting value SV3 may be changed under control of the temperature sensor controller 160. The register 158 may output, to the selector 159, the set first setting value SV1, second setting value SV2, and third setting value SV3.

Figure 9:
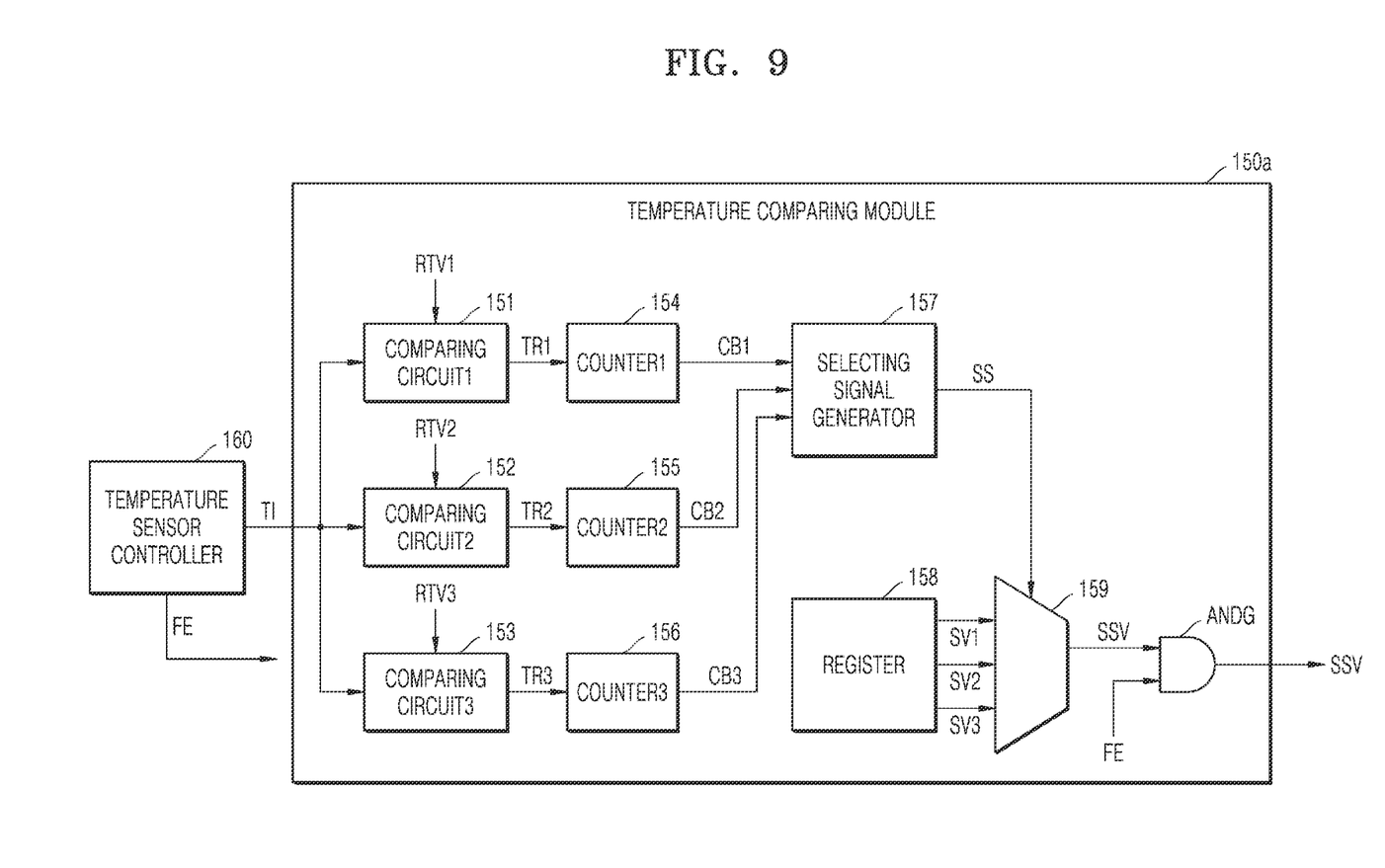
FIG. 9 is a block diagram illustrating a temperature comparing module of a vision sensor according to an example embodiment of the inventive concept.

FIG. 9 is a block diagram illustrating a temperature comparing module 150a of a vision sensor according to an example embodiment of the inventive concept. For convenience of explanation, in the description of FIG. 9, redundant descriptions of the same reference numerals as in FIG. 6 will be omitted.

Referring to FIG. 9, the temperature comparing module 150a may receive the temperature information TI from the temperature sensor controller 160 and output the switching setting value SSV according to results of comparing the temperature information TI with the first to third reference temperature values RTV1 to RTV3. The temperature comparing module 150a may receive, from the temperature sensor controller 160, a frame end signal FE notifying that a frame has ended. The temperature comparing module 150a may output the switching setting value SSV in response to the frame end signal FE. Accordingly, a voltage level of a reset switching signal provided to a reset switch of a pixel, for example, a voltage level of a reset switching signal for turning off the reset switch, may be determined when one frame starts after one frame ends.

In an example embodiment, the temperature comparing module 150a may include the plurality of comparing circuits 151 to 153, the plurality of counters 154 to 156, the selecting signal generator 157, the register 158, the selector 159, and an AND gate ANDG. The AND gate ANDG may receive the frame end signal FE from the temperature sensor controller 160 and receive the switching setting value SSV from the selector 159. The AND gate ANDG may output the switching setting value SSV to the outside (e.g., the voltage level controller 140 of FIG. 2) of the temperature comparing module 150a when the frame end signal FE is activated (e.g., at a high level).

Figure 10:
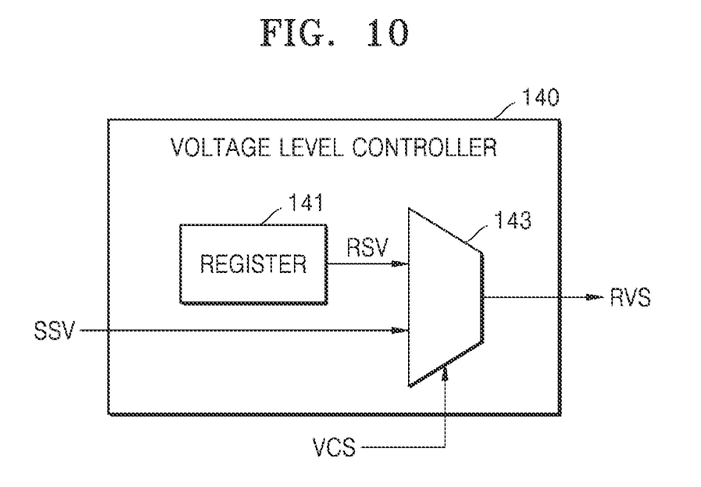
FIG. 10 is a block diagram illustrating a voltage level controller of a vision sensor according to an example embodiment of the inventive concept.

FIG. 10 is a block diagram illustrating the voltage level controller 140 of the vision sensor 100 according to an example embodiment of the inventive concept.

Referring to FIG. 10, the voltage level controller 140 may receive the switching setting value SSV from a temperature comparing module (e.g., 150 of FIG. 6 or 150a of FIG. 9), and may generate the reset bias setting signal RVS that changes a reset bias voltage (e.g., VIASR of FIG. 2) to a set particular level. The voltage level controller 140 may include a register 141 and a selector 143.

A reference setting value RSV may be preset in the register 141, and the register 141 may output the reference setting value RSV to the selector 143. The selector 143 may receive the reference setting value RSV from the register 141 and receive the switching setting value SSV from the temperature comparing module 150 or 150a. The selector 143 may receive a voltage level control signal VCS, and may output, in response to the voltage level control signal VCS, one of the reference setting value RSV and the switching setting value SSV as the reset bias setting signal RVS. The voltage level control signal VCS may vary according to temperature. Accordingly, the voltage level controller 140 may provide, to a voltage generator (e.g., 130 of FIG. 2), the reference setting value RSV, which is a preset register value, as the reset bias setting signal RVS, or may provide, to the voltage generator 130, the switching setting value SSV, which is changed according to the temperature information TI, as the reset bias setting signal RVS.

In an example embodiment, the selector 143 may receive the voltage level control signal VCS from the outside of the vision sensor 100. For example, the voltage level control signal VCS may be received from a processor (e.g., 200 of FIG. 1), and may be received through an inter-integrated circuit (I2C). The processor 200 may control, according to an operating environment of the vision sensor 100, the vision sensor 100 such that the vision sensor 100 generates a reset signal having a preset value or generates, according to temperature, a reset signal in which a voltage level is adjusted.

In an example embodiment, when the temperature of an image processing device (e.g., 10 of FIG. 1) is determined to be in a high state exceeding a threshold value, the processor 200 may control the voltage level controller 140 by transmitting the voltage level control signal VCS to the voltage level controller 140 of the vision sensor 100 such that the voltage level controller 140 outputs, as the reset bias setting signal RVS, the switching setting value SSV that is changed according to the temperature information TI. At this time, the processor 200 may sense, through a temperature sensor outside the vision sensor 100, that the image processing device 10 is in a high temperature state, and the processor 200 may control a temperature sensor inside the vision sensor 100 not to operate. As a result, unnecessary power consumption may be reduced.

In an example embodiment, when the vision sensor 100 operates at a high frequency exceeding a threshold value, the processor 200 may control the voltage level controller 140 to output, as the reset bias setting signal RVS, the reference setting value RSV, which is a preset register value, by transmitting the voltage level control signal VCS to the voltage level controller 140 of the vision sensor 100. In addition, in an example embodiment, when the vision sensor 100 operates at a low frequency below the threshold value, the processor 200 may control the voltage level controller 140 to output, as the reset bias setting signal RVS, the switching setting value SSV that is changed according to the temperature information TI, by transmitting the voltage level control signal VCS to the voltage level controller 140 of the vision sensor 100. As described with reference to FIG. 5B, when a vision sensor operates at a low frequency, a difference in gain of an amplifier according to a temperature change may increase. Accordingly, when the vision sensor 100 operates at a low frequency, the voltage level controller 140 may be controlled to output, as the reset bias setting signal RVS, the switching setting value SSV that is changed according to the temperature information TI.

Figure 11:
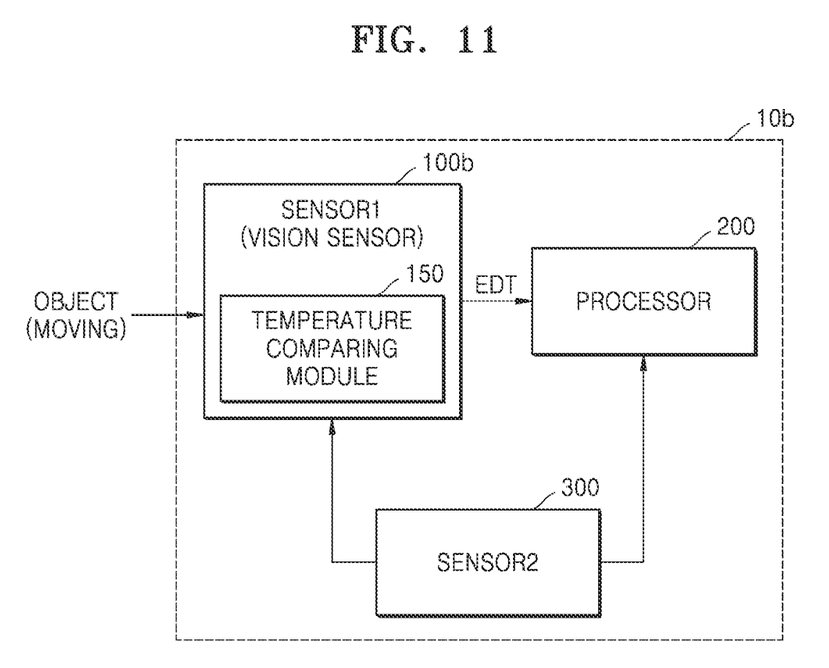
FIG. 11 is a block diagram illustrating an image processing device according to an example embodiment of the inventive concept.

FIG. 11 is a block diagram illustrating an image processing device 10b according to an example embodiment of the inventive concept.

Referring to FIG. 11, the image processing device 10b may include a first sensor, that is, a vision sensor 100b, the processor 200, and a second sensor 300. For example, the second sensor 300 may detect an external environment in which the image processing device 10b operates, for example, an illuminance of an object, a brightness of an object, or a position of the image processing device 10b. For example, the second sensor 300 may include a gyroscope sensor or an illuminance sensor.

The second sensor 300 may provide a sensed signal to the vision sensor 100b through the processor 200, or may directly provide the sensed signal to the vision sensor 100b. The vision sensor 100b may control an operation of the vision sensor 100b based on a signal received from the second sensor 300. In an example embodiment, the vision sensor 100b may determine a voltage level of voltages provided to a pixel array (e.g., PA of FIG. 2) based on the signal received from the second sensor 300. For example, the vision sensor 100b may adjust a voltage level of the reset bias voltage VIASR provided to the pixel array PA based on the signal received from the second sensor 300.

Figure 12:
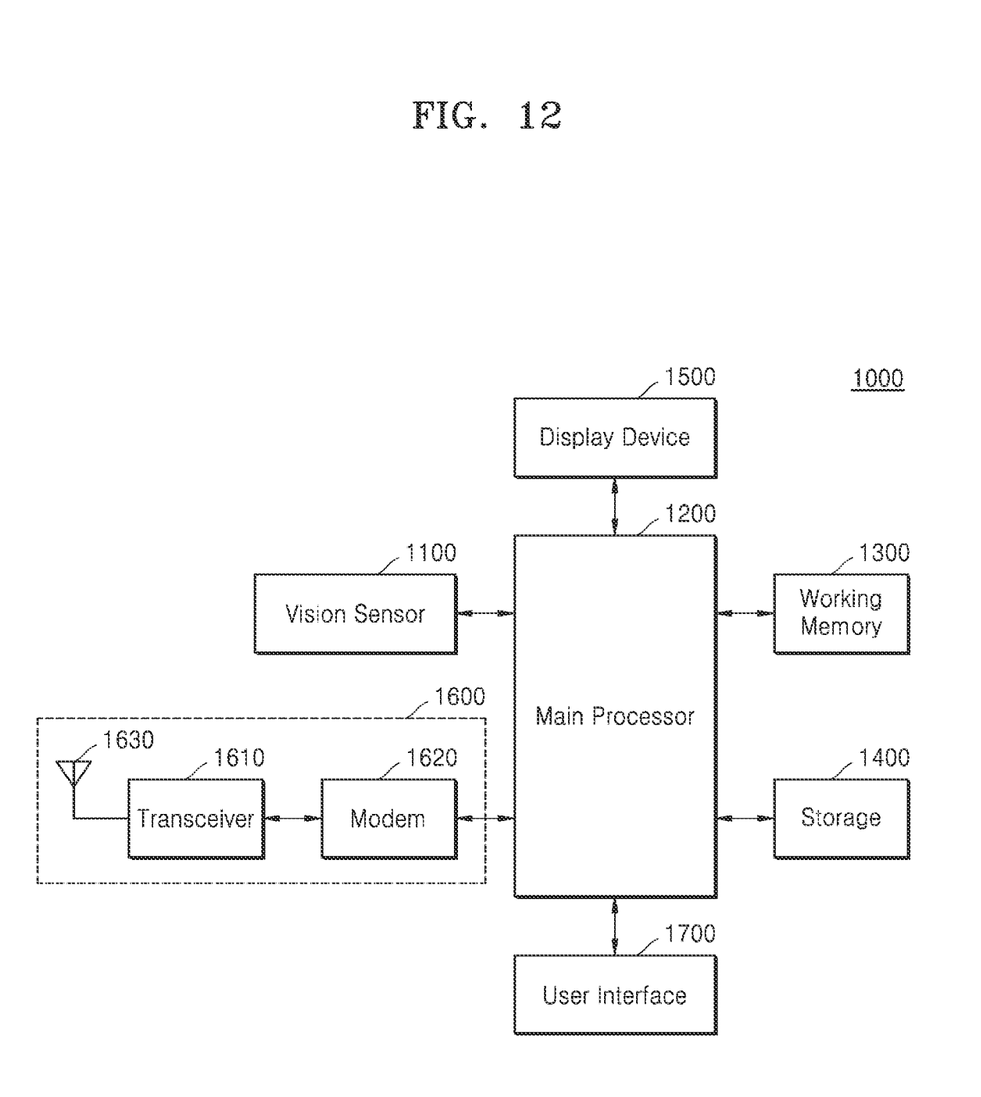
FIG. 12 is a block diagram illustrating an example of an electronic device to which a vision sensor according to an example embodiment of the inventive concept is applied.

FIG. 12 is a block diagram illustrating an example of an electronic device 1000 to which a vision sensor 1100 according to an example embodiment of the inventive concept is applied.

Referring to FIG. 12, the electronic device 1000 may include the vision sensor 1100, a main processor 1200, a working memory 1300, a storage 1400, a display device 1500, a communication unit 1600, and a user interface 1700.

The vision sensor 100 or 100b described with reference to FIGS. 1 to 11 may be applied as the vision sensor 1100. The vision sensor 1100 may generate event signals by sensing an object, and transmit the generated event signals to the main processor 1200. The vision sensor 1100 may increase the detection accuracy of the vision sensor 1100 by changing a voltage level of a reset signal provided to a pixel according to temperature.

The main processor 1200 may control the overall operation of the electronic device 1000, and may detect a movement of an object by processing event data, that is, event signals received from the vision sensor 1100.

The working memory 1300 may store data used for an operation of the electronic device 1000. For example, the working memory 1300 may temporarily store packets or frames processed by the main processor 1200. For example, the working memory 1300 may include a volatile memory such as dynamic random access memory (DRAM) and synchronous RAM (SRAM), and/or a non-volatile memory such as phase-change RAM (PRAM), magneto-resistive RAM (MRAM), resistive RAM (ReRAM), and ferro-electric RAM (FRAM).

The storage 1400 may store data, of which storage is requested from the main processor 1200 or other components. The storage 1400 may include a non-volatile memory such as, for example, flash memory, PRAM, MRAM, ReRAM, and FRAM.

The display device 1500 may include a display panel, a display driving circuit, and a display serial interface (DSI). For example, the display panel may be implemented as various devices such as a liquid crystal display (LCD) device, a light-emitting diode (LED) display device, an organic LED (OLED) display device, and an active matrix OLED (AMOLED) display device. The display driving circuit may include a timing controller, a source driver, or the like, which are utilized to drive a display panel. A DSI host embedded in the main processor 1200 may perform serial communication with the display panel through the DSI.

The communication unit 1600 may exchange signals with an external device/system through an antenna 1630. A transceiver 1610 and a modulator/demodulator (MODEM) 1620 of the communication unit 1600 may process signals exchanged with external devices/systems according to wireless communication protocols such as, for example, Long Term Evolution (LTE), Worldwide Interoperability for Microwave Access (WIMAX), Global System for Mobile communication (GSM), Code Division Multiple Access (CDMA), Bluetooth, Near Field Communication (NFC), Wireless Fidelity (Wi-Fi), or Radio Frequency Identification (RFID).

The user interface 1700 may include at least one of input interfaces such as, for example, a keyboard, a mouse, a keypad, a button, a touch panel, a touch screen, a touch pad, a touch ball, a gyroscope sensor, a vibration sensor, and an acceleration sensor.

Components of the electronic device 1000, for example, the vision sensor 1100, the main processor 1200, the working memory 1300, the storage 1400, the display device 1500, the communication unit 1600, and the user interface 1700, may exchange data according to at least one of various interface protocols such as, for example, Universal Serial Bus (USB), Small Computer System Interface (SCSI), MIPI, I2C, Peripheral Component Interconnect Express (PCIe), Mobile PCIe (M-PCIe), Advanced Technology Attachment (ATA), Parallel ATA (PATA), Serial ATA (SATA), Serial Attached SCSI (SAS), Integrated Drive Electronics (IDE), Enhanced IDE (EIDE), Nonvolatile Memory Express (NVMe), or Universal Flash Storage (UFS).

As is traditional in the field of the inventive concept, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the inventive concept has been particularly shown and described with reference to example embodiments thereof, it will be understood that various changes in form and detail may be made therein without departing from the spirit and scope of the inventive concept as defined by the following claims.

What is claimed is:

1. A vision sensor, comprising:
a pixel array comprising a plurality of pixels;
a voltage generator configured to generate a reset bias voltage provided to each of the plurality of pixels;
a temperature comparing circuit configured to output a switching setting value according to a result of comparing temperature information with at least one reference temperature value; and
a voltage level controller configured to generate a reset bias setting signal based on the switching setting value,
wherein the reset bias setting signal adjusts a voltage level of the reset bias voltage.

2. The vision sensor of claim 1, wherein each of the plurality of pixels comprises:
a reset switch configured to reset the corresponding pixel; and
a buffer configured to generate a reset switching signal using the reset bias voltage,
wherein the reset switching signal switches the reset switch,
wherein the buffer generates the reset switching signal based on one of a reset signal that resets the corresponding pixel and a global reset signal that resets the pixel array.

3. The vision sensor of claim 1, wherein the temperature comparing circuit comprises:
a first comparing circuit configured to output a first result value obtained by comparing the temperature information with a first reference temperature value;
a second comparing circuit configured to output a second result value obtained by comparing the temperature information with a second reference temperature value;
a first counter configured to output, using a clock signal, a first counting bit obtained by counting the first result value;
a second counter configured to output, using the clock signal, a second counting bit obtained by counting the second result value;
a selecting signal generator configured to generate a selecting signal based on the first counting bit and the second counting bit; and
a selector configured to output one of a plurality of setting values as the switching setting value, in response to the selecting signal.

4. The vision sensor of claim 3, wherein the selecting signal generator is further configured to:
receive, from the first counter, a plurality of first counting bits, including the first counting bit, generated at different time points from each other,
receive, from the second counter, a plurality of second counting bits, including the second counting bit, generated at different time points from each other, and
generate the selecting signal based on the first counting bits and the second counting bits.

5. The vision sensor of claim 4, wherein a number of the first counting bits and a number of the second counting bits used to generate the selecting signal are set in the selecting signal generator according to level count number information.

6. The vision sensor of claim 1, wherein the temperature comparing circuit further comprises:
a register in which the plurality of setting values are set.

7. The vision sensor of claim 1, further comprising:
a temperature sensor controller configured to transmit the temperature information to the temperature comparing circuit.

8. The vision sensor of claim 1, wherein the temperature comparing circuit is further configured to output the switching setting value when a frame end signal generated as a frame ends is received.

9. The vision sensor of claim 1, wherein a reference setting value is preset in the voltage level controller, and the voltage level controller is further configured to output, as the reset bias setting signal, one of the switching setting value and the reference setting value according to a voltage level control signal.

10. The vision sensor of claim 9, wherein the voltage level control signal varies according to temperature.

11. A vision sensor, comprising:
a pixel array comprising a plurality of pixels;
a voltage generator configured to generate a reset bias voltage provided to each of the plurality of pixels;
a temperature sensor controller configured to generate temperature information;
a temperature comparing circuit configured to output a switching setting value according to the temperature information; and
a voltage level controller configured to generate a reset bias setting signal based on the switching setting value,
wherein the reset bias setting signal adjusts a voltage level of the reset bias voltage.

12. The vision sensor of claim 11, wherein each of the plurality of pixels comprises:
a reset switch configured to reset the corresponding pixel; and a buffer configured to generate a reset switching signal using the reset bias voltage, wherein the reset switching signal switches the reset switch, and the reset bias voltage comprises a voltage that turns off the reset switch.

13. The vision sensor of claim 11, wherein the temperature comparing circuit comprises:
    a first comparing circuit configured to output a first result value obtained by comparing the temperature information with a first reference temperature value;
    a second comparing circuit configured to output a second result value obtained by comparing the temperature information with a second reference temperature value;
    a first counter configured to output, using a clock signal, a first counting bit obtained by counting the first result value;
    a second counter configured to output, using the clock signal, a second counting bit obtained by counting the second result value;
    a selecting signal generator configured to generate a selecting signal based on the first counting bit and the second counting bit; and
    a selector configured to output one of a plurality of setting values as the switching setting value, in response to the selecting signal.

14. The vision sensor of claim 13, wherein the temperature sensor controller is further configured to transmit the clock signal to the temperature comparing circuit.

15. The vision sensor of claim 13, wherein the temperature sensor controller is further configured to generate and transmit the first reference temperature value and the second reference temperature value to the temperature comparing circuit.

16. The vision sensor of claim 11, wherein a reference setting value is preset in the voltage level controller, and
    the voltage level controller is further configured to output, as the reset bias setting signal, one of the switching setting value and the reference setting value according to a voltage level control signal.

17. The vision sensor of claim 16, wherein the voltage level control signal varies according to temperature.

18. An operating method of a vision sensor, the method comprising:
    generating multiple pieces of temperature information at different time points from each other by sensing a temperature of the vision sensor,
    wherein the vision sensor comprises a plurality of pixels;
    obtaining a specified number of pieces of the temperature information; and
    adjusting a voltage level of a reset switching signal provided to the plurality of pixels based on the obtained specified number of pieces of the temperature information,
    wherein the plurality of pixels is reset according to the reset switching signal.

19. The operating method of claim 18, wherein adjusting the voltage level of the reset switching signal comprises:
    adjusting the voltage level of the reset switching signal according to a result of comparing each of the obtained specified number of pieces of the temperature information with a reference temperature value.

20. The operating method of claim 18, wherein adjusting the voltage level of the reset switching signal comprises:
    adjusting the voltage level of the reset switching signal provided to the plurality of pixels after a frame ends.

* * * * *